Dec. 13, 1949     R. S. BABCOCK     2,491,024
PROCESS OF CUTTING THICK STEEL
Filed Feb. 25, 1944     2 Sheets—Sheet 1

INVENTOR
ROGER S. BABCOCK
BY
ATTORNEY

Dec. 13, 1949 R. S. BABCOCK 2,491,024
PROCESS OF CUTTING THICK STEEL
Filed Feb. 25, 1944 2 Sheets-Sheet 2

INVENTOR
ROGER S. BABCOCK
BY
Ed Greenewald
ATTORNEY

Patented Dec. 13, 1949

2,491,024

UNITED STATES PATENT OFFICE 2,491,024

PROCESS OF CUTTING THICK STEEL

Roger S. Babcock, Cranford, N. J., assignor to The Linde Air Products Company, a corporation of Ohio Application February 25, 1944, Serial No. 523,849

8 Claims. (Cl. 148—9)

This invention relates to a process of cutting thick steel with an oxygen stream and more particularly to a process for severing by oxygen steel bodies that are over two feet thick.

It is customary to cut steel with an oxygen jet by applying such a jet normally against a portion of surface metal which has been heated to ignition temperature and then moving the jet at a uniform rate to form a kerf through the metal. For this purpose, a cutting nozzle was used of a type that customarily provided a stream of oxygen of relatively high velocity which stream was intended to supply oxygen to the kerf for burning the metal, and also to apply a force for blowing out of the kerf the products of combustion. For cutting thin steel it has been customary to employ moderate oxygen jet velocities, small cutting orifices, and moderate oxygen pressures. For cutting increased thicknesses, larger orifices were used, the gas velocity and head pressure were increased, and the blowpipes and cutting nozzles supplied therefor have been proportioned according to such requirements. By the customary cutting methods and cutting blowpipes, great thicknesses of steel have not been successfully cut and for cutting very thick sections of steel it has been necessary to resort to the oxygen lance. Attempts to cut the maximum cuttable thicknesses of steel with the ordinary blowpipe by the use of increased oxygen pressures has resulted in irregular cut surfaces and often it was not possible to sever the metal bodies with a single cut.

Objects of the present invention are to provide a method of severing thicker sections of steel than have heretofore been cuttable with the oxyacetylene blowpipe; cutting the heretofore maximum cuttable thicknesses of steel with greater regularity, uniformity, and certainty; successfully cutting thick sections of steel containing defects or voids which would ordinarily seriously interfere with the cutting operation; and cutting thick sections of steel at a faster rate than can be accomplished by prior methods.

These and other objects and novel features of the present invention will become apparent from the following description and the accompanying drawings, in which:

Figs. 1A, 1B and 1C, and Figs. 2A, 2B and 2C are diagrammatic views of sections respectively of 36 inch thick and 48 inch thick workpieces in the plane of the kerf to illustrate the results of cutting such thicknesses according to prior art methods and according to the invention;

The process of cutting thick steel workpieces according to the invention departs radically from former methods by employing cutting nozzle inlet pressures so low that the cutting jet is discharged from the nozzle under an exit pressure which does not exceed that of the surrounding atmosphere and the velocity of the cutting jet when it leaves the nozzle does not exceed and is preferably below the so-called critical velocity. A nozzle with a straight cutting oxygen bore is preferably employed having a diameter large enough to discharge a stream of oxygen of sufficient volume to cut a kerf extending through the full thickness of the workpiece to be cut.

In discussions relating to the flow of air through orifices and short channels, the term critical velocity may have two meanings. The meaning employed here is that which refers to a velocity equal to the acoustic velocity under the temperature and pressure conditions of the gas at the nozzle. The term critical pressure in such discussions means the pressure in an orifice when the gas flows therethrough at critical velocity. When the discharge takes place into the atmosphere it is found that a critical velocity is reached when the head pressure is increased to a value such that the pressure in the orifice exit is atmospheric and is .53 of the head pressure. Such exit pressure is called the critical pressure, and the ratio .53 is known as the critical ratio. The critical ratio for oxygen is about the same as for air, so that it is seen that the head pressure corresponding to a critical pressure of 0 p. s. i. gauge is about 13 p. s. i. gauge.

The head pressures employed for customary cutting methods are considerably in excess of 13 p. s. i. and therefore the pressure in the nozzle exit customarily is considerably above atmospheric. There is thus a sudden further expansion to atmospheric pressure after the oxygen leaves the nozzle. Such expansion causes an increase of velocity above the critical and also causes a turbulent condition in the oxygen stream.

According to the invention, the oxygen is supplied to the nozzle under a head pressure below about 13 p. s. i. gauge, the value of the exit pressure being then equal to that of the surrounding atmosphere and the velocity of flow of the cutting stream being below the critical velocity. The cutting stream so produced is relatively non-turbulent, is compact and retains its shape for a relatively long distance from the nozzle.

Figure 1A:
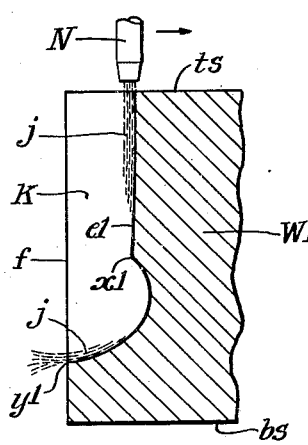

Figs. 1A to 3 illustrate the cutting results observed when cutting thick workpieces with pressure heretofore employed and with pressures according to the invention. In Figs. 1A to 1C inclusive, the cutting nozzle is indicated at N, and the workpieces being severed at W1 to W6 respectively. The reference letter $f$ indicates the end face of the workpiece along which the cut is started and $ts$ and $bs$ refer to the top and bottom surfaces of the workpieces. A cut is started in the customary manner by applying preheating flames at the upper corner between the end face $f$ and the top surface $ts$ with the nozzle N held in the position indicated by broken lines in Fig. 1C. The means for providing heating flames will be described hereinafter. When the metal under the nozzle is heated to ignition temperature, the oxygen is turned on and the oxygen jet or stream $j$ burns a groove down the face $f$ of the workpiece. The nozzle N is moved at a steady rate toward the right as indicated by the arrow and a slot or kerf $k$ is produced in the workpiece.

Fig. 1A illustrates what has been found to occur when the head pressure at the nozzle inlet was 28 p. s. i. gauge. The workpiece W1 was 36 inches thick and initially at room temperature and for a distance downward of about 18 inches to a point $x1$, the cut proceeded normally. The advancing front end wall of the kerf $k$ is indicated by $e1$. The reaction between the steel and the oxygen stream occurs along this wall $e1$. The reaction zone thus extends along the end wall $e1$ of the kerf. At the point $x1$ a disturbance occurred which caused the reaction zone to neck down and then flare and change direction to assume a negative lag condition as indicated by the shape of the end wall $e1$ below point $x1$. The reaction did not carry through the workpiece W1 and the slag product was blown out of the kerf at a point $y1$ in the lower portion of the end face $f$. To cut through the uncut portion below $y1$ by prior methods, an oxygen lance would be employed.

Figure 1B:
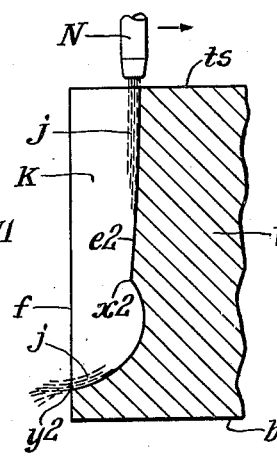

Fig. 1B illustrates the result obtained when the head pressure was reduced to the uncommonly low pressure of 18 p. s. i. It will be seen that the point of disturbance $x2$ is further from the nozzle N and the uncut portion from point $y2$ to the bottom surface $bs$ is reduced.

Figure 1C:
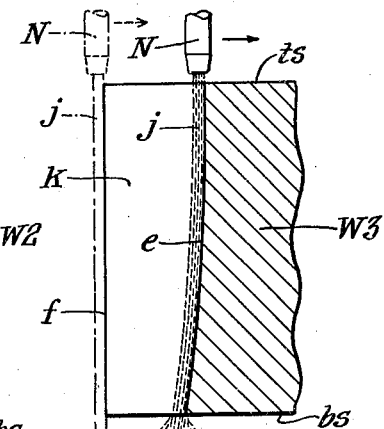

Fig. 1C illustrates the cutting of a 36 inch thick workpiece W3 according to the invention when the nozzle inlet pressure was maintained at 12 p. s. i. No disturbance occurred and the reaction progressed smoothly to the bottom surface $bs$. In each case the diameter of the nozzle cutting oxygen bore was .4 inch and the nozzle was advanced at a speed of a little less than 3.5 inches per minute.

Figure 2A:
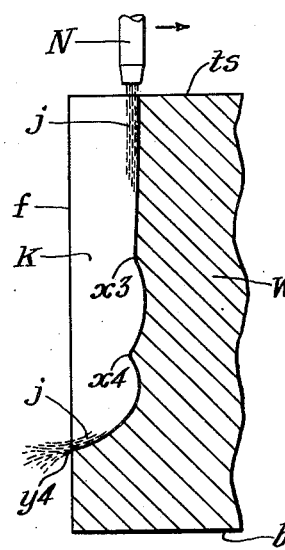
Figure 2B:
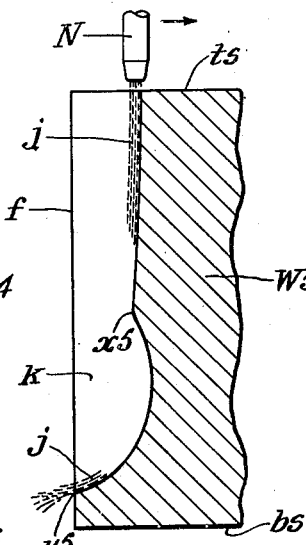
Figure 2C:
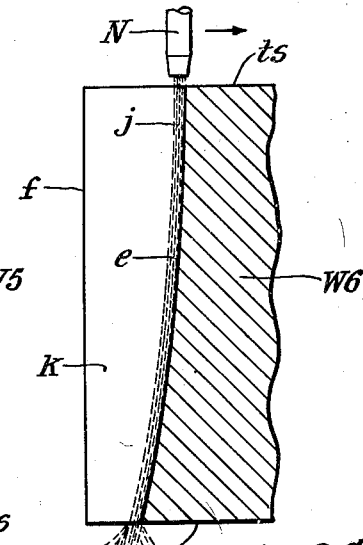

Figs. 2A, 2B and 2C illustrate the cutting of workpieces 48 inches thick. The nozzle N employed had a bore of .6 inch diameter and was advanced at a cutting speed of about 2.5 inches per minute. When the head pressure was 18 p. s. i., the result is shown in Fig. 2A which shows that two nodes of disturbance occurred at $x3$ and $x4$ and the slag found exit in the face $f$ at point $y4$ about 40 inches below the top surface $ts$. By reducing the head pressure to 12 p. s. i. and making a cut, only one point of disturbance occurred as shown at $x5$ in Fig. 2B. The cut still did not penetrate through but extended a depth of 44 inches to a point $y5$.

As shown in Fig. 2C, a smooth cut through the 48 inch thickness was obtained with a head pressure of 7 p. s. i. The bottom of the kerf end wall $e$ lags behind the upper portion by a moderate amount which is called the lag. The amount of this lag is relatively small for such thicknesses.

Figure 3:
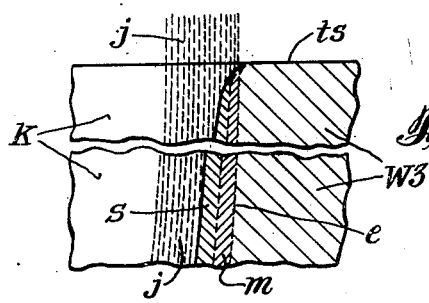
Fig. 3 is a fragmentary diagrammatic illustration on an enlarged scale to illustrate what is believed to occur at the front or leading end wall of the kerf.
Figure 4:
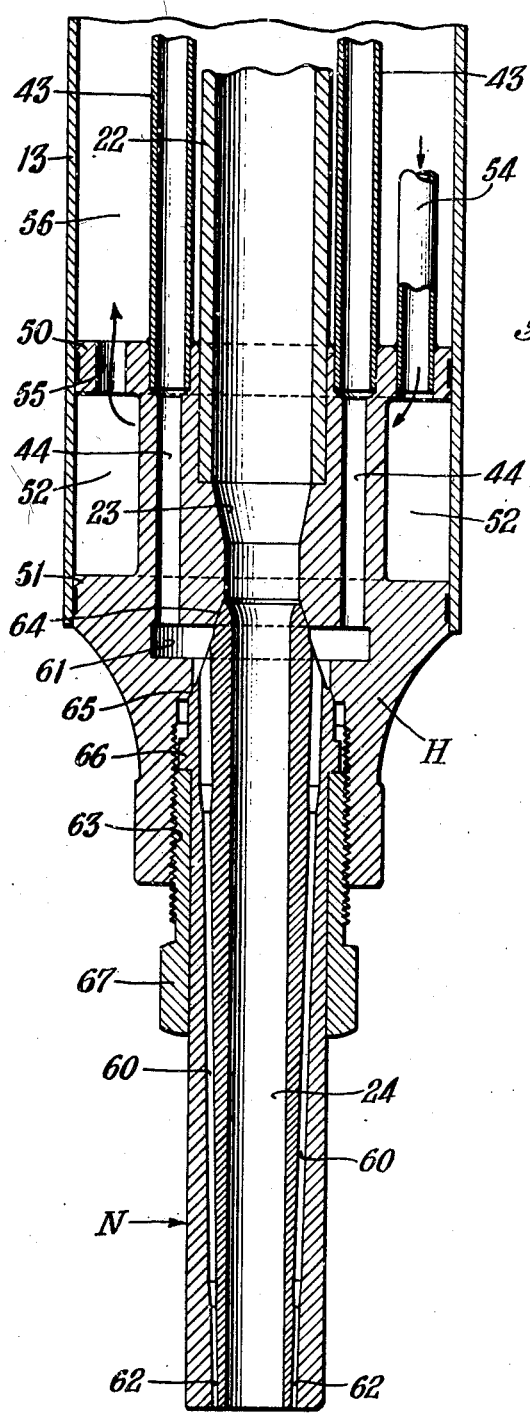
Fig. 4 is a view of a longitudinal cross-section through the lower end of an exemplary blowpipe with an exemplary nozzle attached thereto and adapted for carrying out the process of the invention.
Figure 5:
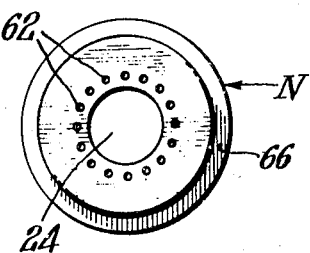
Fig. 5 is an outlet end view of the nozzle shown in Fig. 4.

Fig. 3 is intended to illustrate an explanation of the mechanism of the cutting action. The end wall $e$ of the kerf is believed to have a layer $m$ of melting metal on its surface which tends to flow away from the top surface $ts$ of the workpiece W3. A layer of molten slag $s$ covers the surface of the layer $m$ and flows at a faster rate away from the surface $ts$. The slag $s$ absorbs oxygen from the cutting stream $j$ and transfers it to the molten metal, the oxidation of which creates more molten oxide and considerable heat. The smooth relatively non-turbulent oxygen stream maintains uniform contact with the slag stream $s$ all the way through the kerf and oxidizes the slag thoroughly so that it remains very fluid.

It is believed that in the process of cutting with a higher velocity more turbulent cutting stream according to customary methods, the slag stream produced is much thinner because more of the slag stream is entrained in the jet. The thinner slag stream is also moved along the kerf end wall so fast that there is not enough time for adequate heat transfer from the slag to the lower portions of the kerf end wall and to the underlying layer of metal. The turbulent stream is more easily deflected and once deflected, the resulting action continues to repeat and cause a bad cut.

In the process of the invention the oxygen stream is more stable and the slag stream produced is thicker. Such slag stream, continuously replenished with oxygen, moves along the front end wall of the kerf at a slow enough rate that sufficient heat is transferred to the end wall and the underlying metal to insure uniform action throughout the full depth of the cut.

The blowpipe for carrying out the process of the invention, provides a stream of oxygen of large volume and diameter at a relatively low pressure and low velocity. For this reason, the blowpipe is considerably larger than the customary cutting blowpipes. Referring to the drawings, the blowpipe comprises a nozzle N, a head block H to which the nozzle is secured, and a tubular jacket or casing 13 enclosing water cooling means and gas supply means. A relatively large central tube 22 connects with the head block H which conducts the cutting oxygen to a bore 23 in the head block H that communicates with the central cutting oxygen passage 24 of the nozzle N.

The head block H is preferably provided with a flange 50 at its upper end and a collar portion 51 at an intermediate point which is secured by solder to the lower end of the casing 13. An annular water chamber 52 is thereby formed between the flanges 50 and 51. The cooling water supply is conducted through a tube 54 which conducts it through the flange 50 into chamber 52. The water then flows from the chamber 52 through a hole 55 in the flange 50 and into the chamber 56 formed in the casing 13, and thence out through the rear of the blowpipe. The cooling water is employed for the particular purpose of keeping cool preheat flame gas mixture supply means including conduits 43 that conduct a combustible mixture such as a mixture of oxygen and acetylene to the upper ends of vertical passages 44 in the head H.

The nozzle N in addition to having a straight axial cutting oxygen orifice bore 24, is provided with a series of longitudinal heating gas passages 60 which communicate at their upper ends with an annular chamber 61 into which the passages 44 discharge. Each of the passages 60 terminates in an outlet orifice 62 at the discharge end of the nozzle. There are preferably a relatively large number of such outlet orifices 62 arranged in a circle concentric with the discharge end of the cutting oxygen passage 24. The head block H is provided with a threaded bore 63 which is aligned with the bore 23, and is suitably shaped for receiving the inlet end of the nozzle N which has conical seating surfaces 64 and 65 in contact with similar surfaces of the bore 63. The upper end of the nozzle has a collar 66 to form an abutment for the end of a ring nut 67 having external threads for engagement with threads in the bore 63, and which holds the nozzle in place.

When the blowpipe is in operation, a regulated and suitably proportioned mixture of oxygen and acetylene is formed and conducted through conduits 43, passages 44, chamber 61, through the passages 60, to the heating orifices 62. Upon issuing from the orifices 62, the mixed gases when ignited, burn with an intensely hot flame.

The cutting oxygen is permitted to have a relatively unrestricted passage through the nozzle and blowpipe. Thus, the passages 22 and 23 are preferably larger in cross-sectional area than the passage 24 through the nozzle. It is preferable that the supply passages be in axial alignment with the bore 24 and that there be no sharp edges to cause turbulence in the oxygen stream. The oxygen is preferably supplied to the blowpipe at such a pressure that the pressure in the passage 23 at the inlet end of the nozzle is below a pressure that causes the oxygen stream to be discharged at an exit pressure not exceeding a critical pressure equal to the atmospheric pressure surrounding the nozzle orifice. Such maximum blowpipe pressure is about 13 pounds per square inch above atmospheric. The pressure at the nozzle inlet is therefore maintained below 13 pounds per square inch gauge and is preferably below 12 pounds per square inch, the best range being 6 to 10 pounds per square inch. By maintaining such low head pressure, the oxygen stream discharged from the nozzle is at substantially atmospheric pressure, and has a minimum tendency to expand and thereby diffuse into the atmosphere. As compared to ordinary nozzles, the diameter of the bore 24 is relatively large. Such diameter is necessary in order to supply the quantity of oxygen necessary to carry a cut through great thicknesses of steel. The volume of oxygen flowing in the stream is selected to be sufficient to carry the cut through the particular thickness to be penetrated.

When it is desired to cut a relatively thick section of steel, which may have a thickness range from 24 inches to about 48 inches thickness, the blowpipe nozzle N is positioned normally to the surface of the steel at a distance above such surface of about 2 inches. The heating gases are turned on and the mixture issuing from the orifices 62 is ignited. The resulting flame heats a portion of the surface metal to the ignition temperature and then the cutting oxygen may be supplied.

The proportion of preheat oxygen to fuel gas is usually adjusted so that a so-called neutral flame is produced however, for cutting very thick sections of steel, it is found preferable to increase the proportion of fuel gas to provide a carburizing or reducing flame. Acetylene is the preferable fuel gas and when acetylene is employed, the presence of an intermediate excess acetylene feather adjacent the inner cone of the flame indicates that the flame is carburizing in character. Such a heating flame acts to provide more heat in the lower portions of the kerf for it is found that not all of the heat of the flame is required at the top surface of the work piece.

As explained above, the oxygen stream combines thermochemically with or burns the metal which has been heated by the preheating flame and this burning action progresses through to the other face of the steel. The blowpipe is then moved along the surface of the steel at a uniform rate and in a direction in which the kerf is to be made. The speed of movement may be considerably higher than that which might be expected for the thickness of the metal, and is preferably between 2 and 3.5 inches per minute. Uniform movement is quite desirable and therefore it is preferable that the blowpipe be moved by a cutting machine. The cut may also be made in any position, that is, the nozzle can be vertical or horizontal and the cut may be advanced sideways or downwards.

Examples of cuts in which the cut face produced was smooth and the metal body was completely severed, are as follows:

A 48 inch thick steel body was cut horizontally by using a nozzle having a .6 inch cutting oxygen bore with a cutting oxygen pressure of 7 pounds per square inch gauge, and at a cutting speed of 2.5 inches per minute.

A 14 foot long ingot which was 24 inches square at the bottom and 32 inches square at the top, was severed lengthwise by using a nozzle having a .4 inch diameter bore, an oxygen pressure of 10 pounds per square inch gauge, and a cutting speed of 3⅜ inches per minute.

Cuts were made through cold 40 inch diameter corrugated ingots, using a nozzle with .6 diameter cutting oxygen bore, an oxygen pressure of 7 pounds per square inch, and a cutting speed of 2 inches per minute.

While the flow of oxygen is relatively high and may be as high as 1000 to 6000 cubic feet per hour, the oxygen consumption is not high on the basis of the work accomplished; that is, on the basis of cubic feet of gas consumption per hour, per inch of thickness. The process of the invention is much more economical than lance cutting. For example, it has been found that when cutting 30 inches of steel, the cut according to the invention can be conducted at twice the speed of a lancing operation, and the cut will consume less than ¼ as much oxygen as the same cut made by the oxygen lance. Furthermore, there is no consumption of steel pipe as occurs when operating an oxygen lance.

The best cutting speed varies between 2 and 3.5 inches per minute according to the thickness and metal temperature, the lower speed being used through the maximum thickness. When the entire workpiece is at an elevated temperature before it is cut the cutting action is facilitated and the cutting speed may be increased. It was found that the most uniform kerf surface was obtained at the lower cutting speed. In cutting by prior art methods, high pressure is employed in order to entrain the considerable amount of metal being removed by the scouring action of the oxygen stream against the layer of molten metal and oxides contained in and adjacent to the reaction zone. According to the invention, however, no such scouring action is needed. This appears to be due to the use of a relatively large diameter oxygen jet producing a wide kerf, and the fact that the low-velocity oxygen more completely oxidizes the metal removed to molten oxide which is very fluid and runs freely out of the kerf. The carrying power of the oxygen jet is believed due to the use of a pressure incapable of developing critical velocity and which cause the stream to issue from the nozzle at substantially atmospheric pressure thereby preventing subsequent expansion. The stream remains compact and carries oxygen to a great distance away from the cutting nozzle. The reaction zone produced by the low-velocity non-turbulent oxygen stream has great stability which stability is shown by the fact that such a stream will successfully cut through thick steel sections even though such sections contain relatively large voids directly in the line of the kerf. For example, a 28 inch diameter cast steel section was completely severed, although the kerf passed through a 2 inch diameter void at the center of the section. The process is therefore particularly useful for cutting through casting risers and ingots which frequently contain a pipe at the center.

In order to disclose the broad principles of the invention, a preferred form of cutting nozzle has been described and illustrated. Obviously, certain features may be used independently of others and changes may be made in various features without departing from the essentials of the invention. For example, a part or all of the preheat may be furnished by the combustion of a powdered material, such as powdered combustible metal fed into the flame, and that for cutting metals that resist cutting by oxygen alone, a combustible powdered material such as powdered steel or powdered mixture of metals, may be fed to the reaction zone. In any case, however, the oxidizing gas stream for cutting thick sections of metal should have a substantial thickness, and a low, non-turbulent velocity such as is produced by discharging the stream through a straight bore orifice under a discharge pressure not exceeding atmospheric pressure.

What is claimed is:

1. Process of cutting through a ferrous metal body having a thickness between about two feet and a thickness of the order of about four feet which comprises providing a large cutting stream comprising oxidizing gas having a flow rate in terms of normal temperature and pressure of between one thousand to about six thousand cubic feet per hour; projecting said stream from a nozzle passage against a portion of said metal body which has been heated to an ignition temperature; issuing said stream from the nozzle passage at atmospheric pressure; maintaining the velocity of said stream upon issue from said passage at a value which is not above the velocity of sound in the gas corresponding to the temperature and pressure conditions in said stream; and moving said stream at a uniform rate in a direction laterally of the direction of flow of the stream to form a kerf through the body.

2. Process of cutting through a ferrous metal body having a thickness between about two feet and a thickness of the order of about four feet which comprises providing a large cutting stream comprising oxidizing gas having a flow rate in terms of normal temperature and pressure of between one thousand to about six thousand cubic feet per hour; projecting said stream from a nozzle passage against a portion of said metal body which has been heated to an ignition temperature; issuing said stream from the nozzle passage at atmospheric pressure; maintaining the velocity of said stream upon issue from said passage at a value that is below the velocity of sound in the gas corresponding to the temperature and pressure conditions in said stream; and moving said stream transversely of its direction of flow at a rate between 2 and 3.5 inches per minute to form a kerf through said body.

3. Process of cutting through a ferrous metal body having a thickness between about two feet and a thickness of the order of about four feet which comprises providing a large cutting stream comprising oxidizing gas having a flow rate in terms of normal temperature and pressure of between one thousand to about six thousand cubic feet per hour; providing adjacent said stream a heating flame of reducing character; projecting said cutting stream from a nozzle passage against a portion of said metal body which has been heated to an ignition temperature; issuing said stream from the nozzle passage at atmospheric pressure; maintaining the velocity of said stream upon issue from said passage at a value which is not above the velocity of sound in the gas corresponding to the temperature and pressure conditions in said stream; and moving said cutting stream and heating flame at a uniform rate laterally of the direction of stream flow to form a kerf through said body, the reducing character of the heating flame providing fuel for cooperation with the cutting stream for increasing the penetration of heat to the deeper portions of said kerf.

4. Process of cutting through a thick metal body having a thickness between about two feet and a thickness of about the order of four feet which comprises heating a portion of said body to an ignition temperature by applying thereto a heating flame; directing against such heated portion a stream of oxidizing gas having a flow rate volume in terms of normal temperature and pressure of between one thousand to about six thousand cubic feet per hour sufficient to carry through said metal body; and maintaining the velocity of said stream upon issue at atmospheric pressure from a nozzle passage at a value not exceeding the velocity of sound in the gas corresponding to the temperature and pressure conditions in said stream while relatively moving said stream and said body to form a kerf through said body.

5. Process of cutting a thick metal body according to claim 4 in which said relative movement of the stream and body is maintained substantially uniform at a rate between 2 and 3.5 inches per minute.

6. Process of cutting a thick metal body according to claim 4 in which said heating flame is reducing in character and is maintained adjacent said stream of oxidizing gas during the relative movement so that a portion of said flame is directed into the kerf 7. In a process of cutting through a ferrous metal body having thickness between about two feet and a thickness of the order of about four feet with a cutting stream comprising oxidizing gas, the steps including passing the stream of oxidizing gas through an exit passage of substantially uniform cross-sectional area at a flow rate in terms of normal temperature and pressure of between one thousand and about six thousand cubic feet per hour; and supplying the oxidizing gas to said passage at a pressure between 6 and 13 p. s. i. above atmospheric, such that the exit pressure of the stream is atmospheric and its exit velocity does not exceed the acoustic velocity at the exit temperature and pressure conditions.

8. In a process of cutting through a ferrous metal body having thickness between about two feet and a thickness of the order of about four feet with a cutting stream comprising oxidizing gas, the steps including passing the stream of oxidizing gas through an exit passage of substantially uniform cross-sectional area at a flow rate in terms of normal temperature and pressure of between one thousand and about six thousand cubic feet per hour; and supplying the oxidizing gas to said passage at a gauge pressure between 6 and 12 p. s. i., such that the exit pressure is atmospheric and its exit velocity is below the acoustic velocity, the lower supply pressure being employed with the larger flow rate for cutting the thicker work

ROGER S. BABCOCK.

REFERENCES CITED

The following references are of record in the file of this patent:

UNITED STATES PATENTS

| Number | Name | Date |
|---|---|---|
| 804,002 | Fouche | Nov. 7, 1905 |
| 1,319,097 | Kundson | Oct. 21, 1919 |
| 1,384,224 | Allison et al. | July 12, 1921 |
| 1,659,279 | Morrison | Feb. 14, 1928 |
| 1,818,949 | Hammon | Aug. 11, 1931 |
| 1,830,432 | Hammon | Nov. 3, 1931 |
| 1,840,196 | Hasse | Jan. 5, 1932 |
| 1,891,442 | Oldham et al. | Dec. 20, 1932 |
| 1,957,351 | Oldham | May 1, 1934 |
| 1,971,001 | Geibig | Aug. 21, 1934 |
| 1,985,080 | Crowe | Dec. 18, 1934 |
| 2,108,819 | Jacobsson | Feb. 22, 1938 |
| 2,108,820 | Jacobsson | Feb. 22, 1938 |
| 2,125,180 | Serner | July 26, 1938 |
| 2,148,936 | Geibig et al. | Feb. 28, 1939 |
| 2,175,160 | Zobel et al. | Oct. 3, 1939 |
| 2,192,661 | Jones | Mar. 5, 1940 |
| 2,195,384 | Zobel et al | Mar. 26, 1940 |
| 2,201,960 | Serner | May 21, 1940 |
| 2,210,402 | Gaines, Jr. | Aug. 6, 1940 |
| 2,210,403 | Skinner | Aug. 6, 1940 |
| 2,275,491 | Barna | Mar. 10, 1942 |
| 2,355,330 | Wigton | Nov. 30, 1943 |
| 2,407,972 | Aitchison | Sept. 24, 1946 |

FOREIGN PATENTS

| Number | Country | Date |
|---|---|---|
| 6,944 of 1902 | Great Britain | Mar. 25, 1903 |
| 367,647 | France | Sept. 11, 1906 |

OTHER REFERENCES

Thermo-dynamics, by Enswiler, McGraw-Hill Book Co., New York, 1932. 3rd ed., chap. XVIII, Metals Handbook, 1939, ed. pages 925, 926 and 932. Publ. by American Society for Metals.